United States Patent [19]

Salyer

[11] Patent Number: 5,053,446

[45] Date of Patent: Oct. 1, 1991

[54] POLYOLEFIN COMPOSITES CONTAINING A PHASE CHANGE MATERIAL

[75] Inventor: Ival O. Salyer, Dayton, Ohio

[73] Assignee: University of Dayton, Dayton, Ohio

[21] Appl. No.: 319,835

[22] Filed: Mar. 3, 1989

Related U.S. Application Data

[63] Continuation of Ser. No. 96,288, Sep. 11, 1987, abandoned, which is a continuation-in-part of Ser. No. 937,866, Dec. 2, 1986, abandoned, which is a continuation-in-part of Ser. No. 801,127, Nov. 22, 1985, Pat. No. 4,711,813.

[51] Int. Cl.$^5$ .......................... C09K 3/18; C08K 3/00; C08K 5/01
[52] U.S. Cl. .......................................... 524/8; 252/70; 428/402; 523/205; 524/409; 524/411; 524/464; 524/476; 524/477; 524/478
[58] Field of Search .................. 252/70; 428/402; 523/205; 524/8, 409, 411, 464, 476–478

[56] References Cited

U.S. PATENT DOCUMENTS

| | | | |
|---|---|---|---|
| 3,603,106 | 9/1971 | Ryan et al. | 62/457 |
| 3,639,189 | 2/1972 | Hartman | 428/462 |
| 3,823,089 | 7/1974 | Ryan et al. | 252/70 |
| 4,003,426 | 1/1977 | Best et al. | 252/70 |
| 4,045,515 | 8/1977 | Isaka et al. | 428/220 |
| 4,182,398 | 1/1980 | Salyer | 165/1 |
| 4,253,983 | 3/1981 | Blaine | 252/70 |
| 4,259,198 | 3/1981 | Kreibich et al. | 252/70 |
| 4,273,667 | 6/1981 | Kent et al. | 252/70 |
| 4,463,799 | 8/1984 | Takahashi et al. | 252/70 |
| 4,470,917 | 7/1984 | Hawe et al. | 252/70 |
| 4,504,402 | 3/1985 | Chen et al. | 252/70 |
| 4,505,953 | 3/1985 | Chen et al. | 427/212 |
| 4,513,053 | 4/1985 | Chen et al. | 428/221 |
| 4,545,916 | 10/1985 | Chalk et al. | 252/70 |
| 4,561,989 | 12/1985 | Wada et al. | 252/70 |
| 4,711,813 | 12/1987 | Salyer | 428/402 |

FOREIGN PATENT DOCUMENTS

| | | | |
|---|---|---|---|
| 0022717 | 1/1981 | European Pat. Off. | 252/70 |
| 3045842 | 7/1982 | Fed. Rep. of Germany | 252/70 |
| 2368529 | 6/1978 | France | 252/70 |
| 0042380 | 4/1979 | Japan | 252/70 |
| 0142276 | 8/1984 | Japan | 252/70 |
| 0170180 | 9/1984 | Japan | 252/70 |
| 0232164 | 12/1984 | Japan | 252/70 |
| 0086188 | 5/1985 | Japan | 252/70 |
| 0086191 | 5/1985 | Japan | 252/70 |

*Primary Examiner*—Herbert J. Lilling
*Attorney, Agent, or Firm*—Killworth, Gottman, Hagan & Schaeff

[57] ABSTRACT

A composite useful in thermal energy storage, said composite being formed of a polyolefin matrix having a phase change material such as a crystalline alkyl hydrocarbon incorporated therein, said polyolefin being thermally form stable; the composite is useful in forming pellets, sheets or fibers having thermal energy storage characteristics; methods for forming the composite are also disclosed.

9 Claims, No Drawings

POLYOLEFIN COMPOSITES CONTAINING A PHASE CHANGE MATERIAL

As noted in the parent application, the U.S. Government has certain rights under the inventions disclosed herein pursuant to Department of Energy contract No. DE-AC03-82CE-3025.

This is a continuation of co-pending application Ser. No. 096,288, filed Sept. 11, 1987, now abandoned, which in turn is a continuation-in-part of U.S. application Ser. No. 937,866, filed Dec. 2, 1986, abandoned, which in turn is a continuation-in-part of U.S. Ser. No. 801,127, filed Nov. 22, 1985, now U.S. Pat. No. 4,711,813, issued Dec. 8, 1987.

BACKGROUND OF THE INVENTION

The present invention relates to a composite such as a pellet, fiber, or sheet useful in thermal energy storage and, more particularly, to a pellet, fiber or sheet formed from a polyolefin and having a phase change material therein.

A great deal of interest exists in phase change thermal energy storage systems because of their inherent ability to store, absorb and release large quantities of heat to their surrounding environment as temperatures drop below or exceed predetermined levels. These systems are of particular interest in the architectural and building trades where climate control and its concomitant energy consumption is one of the principal consideration sin building design and material selection.

A variety of building materials and techniques, including structural elements which incorporate phase change materials, have previously been used to conserve heat or cool and thereby educe energy costs. For example, phase change materials have been incorporated into concrete such that energy in excess of that necessary to obtain comfort conditions is inherently absorbed and released, as required to maintain the comfort range. Thus, in the winter months, phase change materials incorporated into the concrete walls or floors of buildings absorb and store solar energy during daylight hours and release it to the interior at night as temperatures decrease. In the summer months, the same phase change materials, due to their thermostatic character, conserve coolness by absorbing cool from the night air and releasing it during the day.

Concrete materials incorporating phase change materials are more desirable than elements which store only sensible heat because they have a higher capacity to store energy, plus they absorb and release a large quantity of energy over a very narrow temperature range.

A phase change material utilizes its latent heat of fusion for thermal storage. The latent heat of fusion is substantially greater than the sensible heat capacity of the material. Stated differently, the amount of energy which a material absorbs upon melting, or releases upon freezing, is much greater than the amount of energy which it absorbs or releases upon increasing or decreasing in temperature 1° C. Upon melting and freezing, per unit weight, a phase change material absorbs and releases substantially more energy than a sensible heat storage material which is heated or cooled to the same temperature range. In contrast to a sensible heat storage material which absorbs and releases energy essentially uniformly over a broad temperature range, a phase change material absorbs and releases a large quantity of energy in the vicinity of its melting/freezing point. In addition to their latent storage capacity, the phase change materials also store and release sensible energy as well. Thus, the latent storage in phase change materials is always augmented to a significant extent by their sensible storage capacity. This advantage is put to good use in buildings where space is at a premium and energy storage and release are required within a very narrow comfort range.

It has long been recognized that an effective phase change material, which could store and release thermal energy within the temperature range of 10-65° C., and could be economically incorporated into concrete, would have broad utility for many heating and cooling applications including solar passive, bridge deck deicing, etc.

Widespread use of the direct incorporation of phase change materials into concrete has not been achieved because the phase change material adversely affects the physical properties of the concrete. Direct incorporation of phase change materials into concrete reduces the strength properties. Thus, the degree of concrete crosslinking required to achieve optimum physical properties is not obtained in the direct presence of the heat phase change material.

It has been suggested to encapsulate phase change materials in pellets for incorporation into concrete and the like. U.S. Pat. No. 4,504,402 to Chen teaches an encapsulated phase change material which is prepared by forming a shell about a phase change composition in compacted powder form. These pellets, however, are comparatively expensive to manufacture.

SUMMARY OF THE INVENTION

The present invention is directed to a composite useful in thermal energy storage. The composite is formed from a crosslinked or uncrosslinked polyolefin having a phase change material such as a crystalline alkyl hydrocarbon incorporated therein. The polyolefin is preferably crosslinked polyethylene and more preferably crosslinked high density polyethylene, although, low density polyethylenes, polypropylenes, polybutenes, etc. are also useful.

The composites of the present invention are useful in a variety of applications. The composites of the present invention can also be used in a thermal storage device where they contact a thermal transfer fluid such as water, air, etc. In accordance with one embodiment of the invention, the composite is a pellet. Such pellets are suitable for incorporation into concrete in building materials and the like (particularly gypsum board) or can be placed in the walls or crawl spaces within a building to conserve heat or cool. In addition to concrete structures, composites can also be incorporated into the structure of various foams such as polyurethane foams, polystyrene foams, etc. by premixing with the polymer before foaming.

The composites of the present invention can also be molded into various bodies having advantageous thermal storage characteristics. In accordance with another embodiment, the composite is a sheet or film material useful as a wall or floor covering Alternatively, the composite may be a molded body such as a floor tile, a wall tile. They can also be used to form bodies which may be placed into hot or cold beverages where they will maintain the desired beverage temperature.

In still another embodiment, fiber or Strand composites can be used to form woven or non-woven insulative fabrics, sheets, mats and the like for clothing, carpet, curtains, etc.

The composite of the present invention is thermally form stable Form stability is achieved by selection of appropriate polyolefins and/or controlling the degree of crosslinking. The polyolefin is preferably crosslinked to such a degree that the pellet maintains its shape (form stability) upon heating to temperatures above the crystalline melting point of the polyolefin and, at the same time, is capable of absorbing at least 10% by weight, and, preferably, at least 50% by weight, of the phase change material.

Another embodiment of the present invention resides in a thermal storage material comprising a cementitious matrix having thermally form stable pellets containing a phase change material dispersed therein, wherein said pellets are formed from a polyolefin containing a phase change material.

In a particularly preferred embodiment, the phase change material in the composite is a crystalline alkyl hydrocarbon which is comprised of one or more crystalline straight chain alkyl hydrocarbons having 14 or more carbon atoms and heats of fusion greater than 30 cal/g. The melting and freezing point of the alkyl hydrocarbon is in the range of 0 to 80° C., preferably 5 to 50° C., and most preferably, 18 to 33° C.

Another embodiment of the present invention is a process for forming a thermally form stable composite which comprises incorporating a phase change material into a polyolefin matrix material In a preferred embodiment of the invention, the composite is formed by immersing a polyolefin body (e.g., a pellet, sheet or fiber), which is preferably crosslinked, into a hot melt of the phase change material which is preferably heated to a temperature above the melting point of the polyolefin. In the most preferred embodiment, the polyolefin is crosslinked high density polyethylene and the phase change material is a crystalline alkyl hydrocarbon.

DETAILED DESCRIPTION OF THE INVENTION

Representative examples of polyolefins which are useful in the present invention are crystalline polyolefins such as polyethylene, polypropylene, polybutene, crystalline polystyrene, crystalline chlorinated polyethylene and poly(4-methylpentene-1). Crystalline ethylene copolymers such as ethylene vinylacetate, crystalline ethylene acrylate copolymers, ionomers, crystalline ethylene-butene-1 copolymers and crystalline ethylene-propylene copolymers are also useful polyolefins. Preferably, the polyolefins are crosslinked such that they are form stable upon heating above their crystalline melting point.

In accordance with certain embodiments of the invention, the composites of the present invention may be formed by the use of commercially available high density or low density polyethylene as the starting component. The term "high density polyethylene" is used herein as it is used in the art, i.e., to refer to polyethylene ranging in density from about 0 940 to about 0.970 g/cc. The term "low density polyethylene" refers to polyethylenes ranging in density from 0.910 to 0.940 g/cc and includes low density polyethylene obtained by the high pressure process and linear low density polyethylene. Lower density polyethylenes form softer, more rubbery composites with the crystalline alkyl hydrocarbon and may be less desirable in some applications due to their lower compressive strength.

Pellet composites can be formed from commercially available high density polyethylene pellets such as Alathon 7040 and Alathon 7050, available from E.I. DuPont; Marlex 6006, available from Phillips Petroleum Co.; LS-556 from U.S. Industrial Chemicals Co.; and, Gulf pellets 9606 available from Gulf Oil Co. with or without crosslinking.

The size of the pellet composites of the present invention is not limited. It may range from about 1 micron to 5 mm in their largest dimension, and preferably range from about 0.5 to 3.0 mm. While various shapes may be used, the pellets are typically spherically or cylindrically shaped, although elongated particles, cubes, monofilaments or fibers can also be used.

The sheets useful as wall or floor coverings in the present invention, are typically about 1.5 to 6.0 mm thick. The fibers may vary widely in their length to diameter ratio depending on the end use.

In some cases, it is not necessary to crosslink the polyolefin to achieve thermal form stability. In some cases, the uncrosslinked polyolefin exhibits sufficient thermal form stability for the intended use. For example, HDPE can be heated above its cloud point and the phase change material can be dissolved therein. This product can be allowed to solidify and then ground to form an uncrosslinked pellet in accordance with the present invention. In another embodiment, the product can be extended and cut into pellets. In most applications, it is desirable to crosslink the polyolefin to increase form stability. Crosslinking is also desirable because it reduces tack. In this manner, composites such as pellets can be used in a bed through which a heat exchange fluid readily passes.

Various methods of crosslinking polyolefins are known. Gamma and electron beam radiation are the most convenient, and the preferred methods for crosslinking polyethylenes. Polyethylenes may also be chemically crosslinked with silane or peroxide as discussed and emplified below. Polypropylenes and polybutenes can be crosslinked with silanes as described later.

It is essential that the degree of crosslinking is controlled such that the polyolefin is thermally form stable. If the composites are not sufficiently crosslinked, they may partially fuse together or dissolve during the heating process to imbibe the phase change material or later upon heating in a thermal energy storage device. At the same time, pellets, sheets, fibers and similar composites cannot be so heavily crosslinked that they do not absorb sufficient phase change material. Thus, in crosslinking, a balance exists between thermal form stability and capacity for phase change material. A degree of crosslinking should be selected which provides the most desirable balance of these two properties, i.e., thermal form stability with a high capacity for the phase change material.

The term "thermal form stability" in its broadest sense means that the composite is thermal form stable in its intended use. Thus, in incorporating the phase change material and in using the composite, the composite does not melt or agglomerate to such an extent that the pellet is not useful. For certain polymers form stability at lower temperatures (e.g., 100° C.) will be suitable whereas for other uses form stability at higher temperatures (e.g., 180° C.) will be required.

In accordance with the most preferred embodiments of the invention the polyolefin is a crosslinked polyolefin which retains its shape upon heating to temperatures above its crystalline me point. This is important because it permits maximum imbibition of the phase change material. It has been found that substantially greater amounts of the phase change material (up to 85% based on the weight of the composite) can be incorporated into the composite when the polyolefin is heated above its melting point. This requires that the polyolefin be form stable at these temperatures. If the polyolefin is not form stable at these temperatures and lower temperatures are used, relatively low amounts (e.g., 10%) are incorporated into the pellet.

The composite may be examined for thermal form stability by placing a sample of it in refluxing phase change material at 50–185° C. and observing it for adhesion. Preferably, the composite is essentially free of adhesion or tack at temperatures up to at least about 50° C.

The electron beam or gamma radiation dose used for crosslinking polyethylene, is typically in the range of about 2–12 megarads, and preferably, about 6–10 megarads. The amount of irradiation must be adjusted within the aforementioned ranges for the particular pellet or sheet used. The irradiation dosage within the above ranges does not appear to have a significant effect on the melting point of the polyethylene, but it clearly affects its capacity to absorb phase change material and its thermal form stability. Gamma irradiation crosslinking is carried out in an inert atmosphere or under vacuum. A nitrogen atmosphere is preferred.

When Alathon 7040 pellets receive a total dosage of 2–4 megarads, they fuse into a single mass within 2.5 hours at 145 to 165° C. in refluxing ethylene glycol and are not suitable as a thermal energy storage medium At 6 megarads, they may adhere together after 72 hours, but the mass is easily crumbled and the pellets are useful as a phase change material With exposures of 8 megarads or more, the pellets remain free flowing Similar results are obtained with Marlex 6006 pellets although pellets receiving 8 megarads exposure adhere at their points of contact after 3 hours at 165° C. in refluxing ethylene glycol. USI LS-630 pellets require 10–12 megarad dosages before they are sufficiently thermal form stable to be useful as a storage medium. Gulf Oil 9606 pellets adhere slightly after 96 hours at 165° C. when exposed to 4 megarad levels, but remain essentially free flowing at 8 megarad levels and above.

The preferred crosslinked, high density polyethylene forming the composites of the present invention can also be characterized by a gel content of at least 10%, and more preferably, at least 30%. Resistance to melt flow or thermal flow stability is related to the gel content of the crosslinked material. The final gel content varies with the high density polyethylene used; depending on the product, gel contents of 30–50% and up to 90% may be achieved.

The capacity of the polyolefin to absorb the phase change material is equally as important as its thermal form stability and must also be considered in selecting the optimum crosslinking dosage. For example, these materials may be crosslinked to a state in which they are thermally form stable, but they are not desirable for thermal energy storage due to their low capacity for the phase change material. In accordance with the present invention, the degree of crosslinking is controlled such that the polyolefin is capable of absorbing at least 10% by weight phase change material, and preferably, at least 50% by weight. Of course, in some cases, crosslinking the polyolefin may be unnecessary.

When an electron beam is used to crosslink, the desired irradiation dosage can be achieved with various combinations of electron beam voltage and beam current. In the case of polyethylenes, these conditions should be in the ranges of greater than about 500,000 volts and about 3–33 milliamps to uniformly crosslink the composites and achieve the desired thermal form stability and capacity for phase change material. Usually, the maximum beam potential available is used which is typically 3–5 million volts. If the potential is in excess of 10 million volts, residual radiation becomes a factor. Hence, the beam potentials useful in the present invention range from about 500,000 to 10 million volts.

In irradiation crosslinking pellets, the depth of the pellet bed and the bed velocity passing across the electron beam must be adjusted to ensure the pellets receive the aforesaid radiation dose. In the case of an extruded sheet, the velocity of the sheet primarily determines the radiation dose when the thickness of the sheet does not exceed that at which entry and exit potentials are equal.

Radiation dose can be expressed by the equation:

$$D = 36\, F_i\, F_e\, IV/[t\, A/T]$$

where $F_i$ and $F_e$ are the beam current and beam energy efficiencies; I is the beam current; V is the beam potential; t is the bed depth in $g/cm^2$; and A/T is the area thruput in $cm^2/hr$. Hence, to deliver a predetermined dosage D, the thickness of the pellet bed or extruded sheet is a function of the beam potential and the area thruput is a function of the beam current. The above equation can be rewritten:

$$D = 360\, F_i\, F_e\, P/(M/T)$$

by replacing IV with the power of the beam in kilowatts and t A with the mass of the bed or sheet in kilograms thereby illustrating that the mass thruput M/T is a function of beam power.

At potentials on the order of 500,000 volts, the maximum permissible pellet bed depth is about 0.30 cm. At potentials nearing 5 million volts, the bed depth can be up to 1.25 cm. At these voltages and bed depths, equal entrance and exit energy is achieved and the pellets are uniformly penetrated by the electron beam. Similar voltages can be used to process sheets. While it is not necessarily essential to have uniform crosslinking, it is generally desirable. Non-uniformly crosslinked pellets, for example, pellets having a higher degree of crosslinking in the shell than the core, are useful in man applications.

The velocity with which a pellet bed or an extruded sheet can be passed through the electron beam is a function of the beam current. At higher currents within the aforementioned range, higher velocities can be used. Thus, to maximize the rate of production, it is desirable to select the maximum amperage available for the electron beam. In this manner, the pellets or sheets can be processed most efficiently. In some cases, it may be desirable to use multiple passes through the electron beam, for example, where the electron beam is unable to deliver the amperage needed to deliver the requisite radiation dosage in one pass.

In crosslinking pellets, by adjusting the bed depth for the beam potential, equal entrance and exit energies are achieved and it is unnecessary to agitate the pellet bed to achieve uniform crosslinking. Such agitation may be desirable if higher bed depths are used and processed by multiple passes. In such cases, the bed may be agitated by stirring between passes. This technique may be used when processing large quantities although it is preferable to limit the bed depths as above such that irradiation can be conducted in one pass without agitation.

Irradiation in an oxygen containing atmosphere, such as air, is accompanied by the production of ozone which can lead to some surface oxidation. While this occurrence has not been found to be particularly troublesome, it can be avoided by conducting irradiation in an oxygen-free environment, such as a vacuum, nitrogen, carbon dioxide, or similar inert gases. It is not clear that the effects of surface oxidation justify the additional expense of using inert atmospheres, but an improvement in the thermal form stability has been observed in this manner.

A typical example of the irradiation conditions used to crosslink Alathon 7040 pellets is:
  Voltage: 3 million volts
  Current: 33 milliamps
  Pellet Bed Depth 0 25 to 0.5 inch
  Bed Velocity: 16 feet per minute
  Atmosphere: air
  Passes: 1
  Doses: 6 megarads An example of irradiation conditions for the same pellets using multiple passes is:
  Voltage 3 million volts
  Current: 20 milliamps
  Total Dosage 8 megarads
  Dosage Per Pass: 2 megarads
  Passes: 4
  Agitation stirred after each pass
  Atmosphere: air Pellets and sheets can also be easily crosslinked through gamma radiation. Dosages in the range of about 4 to 12 megarads may be used. Irradiation is preferably carried out in an inert atmosphere such as nitrogen, helium, hydrogen or a vacuum. It may also be carried out in air, but requires significantly higher total doses than in an inert atmosphere. A nitrogen atmosphere is the lowest cost and therefore, the preferred irradiation atmosphere.

Chemical crosslinking is also feasible and desirable for some polyolefins. Various chemical crosslinking reactions may be used but two which are particularly useful silane graft crosslinking and peroxide crosslinking.

U.S. Pat. No. 4,182,398, and 3,646,155 disclose several methods for chemical crosslinking high density polyethylene which can also be used to crosslink other polyolefins, and particularly, polypropylenes. Under the silane-grafted method, a polyolefin is charged to a Banbury with an unsaturated silane such as vinyl triethoxy silane and a free radical initiator such as benzoyl peroxide and mixed to produce a silane-grafted polyolefin which is then mixed with a catalyst such as dibutyl tin dilaurate and crosslinked by heating in boiling water or steam and then air dried.

In a peroxide method, which is only useful with polyethylene, the powder may be dry blended with dicumyl peroxide, di-t-butyl peroxide, 2,5-dimethyl-2,5-bis(t-butylperoxy)hexane, 2,5-dimethyl-2,5-bis(t-butylperoxy) hexyne 3 or a similar high temperature free radical generating agent and melt extruded at about 150 to 200° C., and preferably, about 175° C., to crosslink the polyolefins. In another method, polyethylene powder such as HDPE powder is melted on a mill, and as soon as a smooth sheet of polyethylene is formed, dicumyl peroxide may be added. Dicumyl peroxide is usually reacted in an amount of about 0.1 to 5% by weight, and preferably, about 1% by weight.

The above methods provide crosslinked polyolefin bodies which can be used in the manufacture of floor or wall coverings or which can be cut into pellets or spun or drawn into fibers. The crosslinked pellets, sheets, or fibers can be impregnated with a phase change material to obtain products in accordance with the present invention.

Processes such as compression or injection molding can also be used to form the pellets, but they tend to be less economical. They are however, useful in forming floor or wall coverings. In accordance with this embodiment of the invention, sheets, tiles, or the like are formed by compression or injection molding and crosslinked simultaneously or afterward by electron beam or gamma radiation as described above.

To make fibers, the polyolefin may be melt spun, drawn, or extruded. Then, the fiber is immersed in a melt of the phase change material. Where a crosslinked fiber is desired, a silane grafted polyolefin may be coextruded with a polyolefin composition containing a condensation catalyst to produce a composition which can be spun and drawn. The fiber is immersed in a water bath or treated with steam to crosslink it and then immersed in a melt of the phase change material.

The phase change material is preferably incorporated into the polyolefin body by immersing the polyolefin body (e.g., sheet, pellet, fiber, etc.) into a bath of melted phase change material. The temperature of the phase change material should be higher than the crystalline melt point of the polyolefin to imbibe the maximum amount of the phase change material. The polyolefin body is retained in the bath until at least about 10% by weight of the straight chain alkyl hydrocarbon is absorbed.

The crosslinked crystalline polyolefin/PCM composite of the present invention can also be in the form of a molded article such as a flower port or beverage container. The crosslinked polyolefin body in the basic form of a flower pot or beverage container is immersed into a vat of melted phase change material in order to incorporate the phase change material into the polyolefin body. Typically, potted plants are kept in environments wherein the temperature is maintained at a higher level during daytime or working hours than during evening or non-working hours. By forming the flower pot from the composite of the present invention, the phase change material absorbs large amounts of heat during the higher temperature periods and releases it to the soil, and thus, to the plant during the lower temperature periods. As such, the soil and the plant are kept at a more constant temperature. Plants, which have been kept in pots formed from the composite of the present invention, have been found to flourish in this environment.

The pellets of the present invention can also be mixed directly with the soil to prevent frost.

A beverage container formed from the composite of the present invention maintains the temperature of a liquid therein.

Absorption of about 40 to 80% by weight of the phase change material is preferred in the case of the pellets. The time/temperature required to achieve this capacity of phase change material will depend on the nature of the polyolefin, for example, the type of polyolefin and the degree of crosslinking. This degree of absorption is achieved by allowing pellets to remain in a melt of phase change material for up to 1 to 2 hours at about 150 to 185° C.

Other methods for incorporating the phase change material into the polyolefin can also be used. The phase change material can be directly mixed with the uncrosslinked polyolefin or the two materials can be blended and hot melt extruded but generally lesser amounts of phase change material can be incorporated in this process.

Various phase change materials are useful in the present invention. Substantially any phase change material can be used which is compatible with the polyolefin. In most cases, compatible phase change materials will be characterized by a long alkyl chain within their molecular structure. Preferred phase change materials are crystalline organic compounds such as crystalline alkyl hydrocarbons, crystalline fatty acids, crystalline fatty acid esters, crystalline alicyclic hydrocarbons, and crystalline aromatic hydrocarbons which melt and freeze within the desired thermal transfer temperature range (e.g., 0 to 80° C.).

A number of commercially available waxes are useful as phase change materials in the present invention including Shellwax 100 (MP 42-44° C.), Shellwax 120 (MP 44-47° C.), Shellwax 200 (MP 52-55° C.), Shellwax 300 (MP 60-65° C.) al of which are products of Shell Oil Co.; Boron R-152 (MP 65° C.) a product of Standard Oil of Ohio (SOHIO); Union SR-143 (MP about 61° C.) a product of Union Oil Co.; Witco 128 (MP about 53° C.) Witco LLN, Witco 45A, Witco K-61, Witco K-51, and Witco 85010-1 all products of Witco Corporation (Kendall Division); Aristowax 143 (MP 34-61° C.), and Paraffin 150 (MP about 61° C.). These waxes have heats of fusion greater than 30 cal/g and by comparison to other phase change materials, they are inexpensive. Many of them cost as little as 15¢ (U.S.) per pound when purchased in a tank car quantity. A secondary solid state transition has been observed in many waxes. Generally it is observed in odd carbon number waxes of C-9 and greater and in even number waxes of C-24 and greater. As the carbon numbers increase, the secondary transition decreases until it finally disappears.

A preferred group of waxes for use in the present invention are commercially available mixtures of crystalline alkyl hydrocarbons which melt in the range of 10 to 50° C. Mixtures of alkyl hydrocarbons are obtained at low cost as by-products of petroleum refining. Typically these are blends of alkyl hydrocarbons which differ by no more than 4 or 5 carbon atoms. A typical example is Witco 45A which contains about 21% C-18, 33% C-19, 26% C-20; 11% C-21 hydrocarbon, and the balance higher and lower hydrocarbons. Because they are inexpensive, they can be incorporated into building materials at minimal additional expense and, at the same time, provide high savings in terms of reduced energy costs.

While these waxes are mixtures they exhibit one melting freezing point which is the average of the melting freezing points of the constituents. The preferred blends for passive heating and cooling have a melting and freezing point in the range of 24 to 33° C. (as explained below, the melting and freezing point are preferably the same). Preferred blends for passive cool storage have a melting and a freezing point in the range of 18 to 33° C. In many applications, the blends will be relied upon for both heating and cooling and will be characterized by both the melting and a freezing point in the range of 20 to 25° C.

Ultra pure alkyl hydrocarbons C-16 to C-22 and higher are also available at a premium cost that may have higher heats of fusion and crystallization (e.g., 55-60 cal/g) than the low-cost mixtures described above. These ultra pure alkyl hydrocarbons are also useful in the present invention for critical applications requiring maximum storage capacity in the minimum volume of space.

Another consideration in the selection of waxes used in the present invention is the difference between the melting and freezing points. The alkyl hydrocarbons are self-nucleating and thus melt and freeze congruently. Thus, when heated or cooled at rates of 2° C./min. or less, the melting and freezing temperatures substantially coincide.

In addition to providing blends of alkyl hydrocarbons which exhibit phase change characteristic which are intermediate or approximately the average of the individual phase change materials making up the blend, it is also possible to provide a blend which exhibits two or more distinct phase changes. In a crystalline polyolefin, three phase changes are observed, those of the two or more waxes, plus that of the polyolefin. Such a blend is useful in applications where the phase change material is relied upon to conserve heat in the winter and conserve cool in the summer. For this embodiment of the invention, the difference in the melting points of the phase change materials should be at least 10° C.

Further, in the present invention, the crystalline-to-amorphous phase change of the high density polyethylene can be preserved in the composite sheets or pellets, with however, the melting point of the HDPE lowered from 132° C. to about 115° C. There is thus provided a dual temperature range thermal energy storage system in which the heat of fusion and crystallization of each component is expressed in proportion to their respective concentration in the composite.

Another embodiment of the present invention utilizes flame-resistant halogenated hydrocarbons as fire-retardant additives to the alkyl hydrocarbon phase change materials. Typical examples of flame resistant hydrocarbons are halogenated hydrocarbons, such as chlorinated or brominated hydrocarbons. Representative examples include Chlorowax 70, available from Diamond Shamrock and decabromodiphenylether, available from Ethyl Corp. These halogenated fire retardants can be used in admixture with conventional flame-resistant fillers such as antimony oxide or a blend of pentaerythritol and monoammonium phosphate, etc. The weight ratio of halogenated fire-retardant to filler may vary, but it is typically about 1:1 to 3:1.

Flame-resistant halogenated fire-retardant formulations have previously been added to polymers to render them self-extinguishing. Some of the fire retardant materials used for this purpose may also be useful as flame-resistant phase change materials by themselves in accordance with the present invention.

A particularly useful flame-resistant hydrocarbon is a brominated hydrocarbon. Only brominated hydrocarbons which are miscible in the phase change material are useful in the present invention. Miscibility is particularly important when permeating the flame-resistant hydrocarbons into the polyolefin along with the phase change material. An example of a commercially available brominated hydrocarbon which is miscible in the phase change material is dibromoethyldibromo cyclohexane which is available as Saytex BCL-462 from the Ethyl Corporation. It has been found that Saytex BCL-462 must be incorporated into the phase change material in a concentration of at least ten percent in order to provide a self-extinguishing product.

Another useful fire retardant is a halogenated phosphate. Particularly useful flame-resistant halogenated phosphates are chlorinated phosphates such as tri(beta-chloroisopropyl) phosphate which is commercially available under the designation FYROL PCF and tri(-beta-chloroethyl)phosphate which is commercially available under the designation FYROL CEF, both from Stauffer Chemical Company, Specialty Chemical Division. Although insoluble in the phase change material, tri(beta-chloroisopropyl) phosphate can be dispersed in the phase change material.

In still another embodiment of the invention fatty acid esters such as stearates are used as phase change materials.

In some cases it may be desirable to include a filler such as finely divided silica or calcium sodium metaphosphate whiskers in the composite to prevent seepage of the phase change material. The filler may be used in an amount of about 10 to 50% or higher in some applications.

One example of an useful filler is silica such as Cab-o-sil, Hi-Sil, etc.

The cementitious composition of the present invention includes a cementitious material as a rigid matrix forming material. Typical examples of useful cementitious materials are hydraulic cements, gypsum, plaster of Paris, lime, etc. Portland cement is by far the most widely used hydraulic cement. Portland cements are ordinarily used for construction purposes. Types I, II, III, IV, and V may be used. White cements, air entrained cements, high alumina cements, and masonry cements may also be used.

Concretes are mixtures of hydraulic cements and aggregates. Typical aggregates include conventional coarse aggregates, such as gravel, granite, limestone, quartz sieve, etc., as well as so-called fine aggregates, such as sand and fly ash. Conventional hydraulic cement concretes, for example, Portland cement concretes, employ major amounts, about 50–70% by volume of such aggregates in the set product. These cements and concretes fall within the term "cementitious material" as it is used herein.

The cementitious compositions of the present invention also include concrete and plaster compositions useful in the manufacture of pre-formed materials, such as concrete blocks, dry wall, and the like, as well as in forming poured concrete structures such as used in forming the walls, floors, floor pads, and partitions of buildings. In addition, the compositions of the present invention also include compositions useful in roadway, runway, and bridge deck construction where icing may be prevented by incorporation of the phase change material for thermal energy storage during the day, and release during the night to prevent freezing of the water on the surface. The pellets of the present invention can also be incorporated into unfired clay bricks or other porous medium such as foams. The composites can also be used in voids in building spaces such as walls, floors, and the like.

The cementitious compositions of the present invention can be assigned for use in various passive thermal storage applications by appropriately selecting the melting point of the alkyl hydrocarbons. Alkyl hydrocarbons which melt in the range of about 20–42° C. are used in passive solar heating, such as in building materials and the structures previously mentioned. For bridge deck or roadway deicing, alkyl hydrocarbons which melt at about 5–15° C. are preferably used.

A partial listing of building materials which may be modified to incorporate alkyl hydrocarbons as phase change materials in accordance with the present invention includes: concrete block, concrete brick, concrete slab, dry wall, and gypsum board. The amount of alkyl hydrocarbon-containing composite used in the cementitious or concrete materials is typically about 5 to 25% by weight. The amount will vary with the density of the concrete used. At least 5 weight percent is required for adequate storage capacity. In excess of 25% by weight pellet, usually reduces the strength characteristics of a product to a level at which it is less useful.

The present invention is more fully illustrated by the following non-limiting examples.

EXAMPLE 1

A procedure for silane grafting and crosslinking HDPE pellets is illustrated by the following example.

A charge of 2000g of Alathon 7040 HDPE (DuPont) pieces was added to a large Banbury mixer and fluxed 4 to 5 minutes at a temperature slightly above room temperature (no steam). A charge of 120g (6 phr, i.e. parts per hundred parts resin) vinyl triethoxy silane (Union Carbide A-151) containing 4g (0.2 phr) benzoyl peroxide was added and 5 minutes of mixing with steam on (120 psi) began. At the end of this time, cooling water was turned on and approximately 4 pounds silane-grafted polyethylene cake removed from the Banbury after 2 minutes cooling time.

The grafted cake was next cold pressed into round flat disks which can readily be cut into strips via a bandsaw and then granulated into flakes or pieces suited for extrusion.

The silane-grafted flakes were co-extruded in a 95/5 (w/w) ratio with a catalyst batch (consisting of 100 parts Alathon 7040, 1 phr dibutyl tin dilaurate and 0.15 phr benzoyl peroxide prepared via mixing on a hot mill roll, and granulated into flakes) using a 1 inch (2.54 em) extruder (2 passes, all zones at 165° C.) and chopped into pieces.

The silane-grafted HDPE pieces were crosslinked by heating in boiling water for about 24 hours, removed and air (or low-temperature) oven dried. A sample of crosslinked pieces heated in air at 200° C. exhibited excellent form stability (no flow); the pieces did not stick to one another when cycled around the PE melting point in ethylene glycol several times.

EXAMPLE 2

Using the procedure of Example 1, polypropylene pellets were prepared by mixing polypropylene with vinyl triethoxy silane and benzoyl peroxide to produce silane grafted polypropylene which was coextruded with polypropylene containing dibutyl tin dilaurate, cut into pellets and crosslinked in hot water or steam.

EXAMPLE 3

Peroxide crosslinking of HDPE was performed as follows:

50 g of Alathon 7040 HDPE to be crosslinked was melted on the small steam-heated mill roll at ca. 150° C., dicumyl peroxide oil to 5% by weight was then added to the molten PE and milling continued only long enough to assure complete mixing. The PE sheet was removed from the mill roll and compression molded in an electrically heated press for 30 minutes at 170° C. and 700 psi. The mold samples (generally 6'×6"×⅛") were then cooled slowly in the mold to room temperature and next cut into strips to be chopped into pellets (approximately ¼"×⅛"×⅛"). The results are shown in Table 1.

TABLE 1

THERMAL PROPERTIES OF COMPRESSION MOLDED CROSSLINKED ALATHON 7040 HDPE RESIN

| Peroxide Crosslinking Agent | | Thermal Form-Stability[b] | |
|---|---|---|---|
| Name | Concentration (phr) | Pellets Flow on Melting | Pellets Stick Together on Melting |
| none | — | yes | yes (fused) |
| dicumyl peroxide | 0.25 | yes (v. slight) | yes (slightly) |
| dicumyl peroxide | 0.50 | no | no |
| dicumyl peroxide | 0.75 | no | yes (slightly) |
| dicumyl peroxide | 1.0 | no | yes (slightly) |
| Lupersol 101[a] | 0.5 | no | yes (slightly) |

[a]Tradename for 2,5 dimethyl-2,5-bis(t-butylperoxy) hexane (Lucidol Division, Pennwalt Corporation).
[b]Touching pellets heated in air to 200° C. on Fisher-Johns m.p. apparatus.

EXAMPLE 4

A second method used to produce crosslinked polyethylene composites was via extrusion of a peroxide-containing HDPE. Dicumyl peroxide was incorporated at room temperature via tumble-blending of the PE pellets with or without an inert diluent (mineral oil) containing the peroxide. Extrusion of pellets coated with peroxide was performed using a A. C. W. Brabender single screw (¾ in. screw size) extruder with 4 heated zones. Temperatures of the zones could be adjusted and also screw speed altered to vary throughput times. The extruded strand of crosslinked PE was chopped into pellets. Pellet sizes could be varied—generally they were ¼ in. (length) by ¼" in. (diameter) or less. Effects of crosslinking could be visually observed in the extruded strand depending on the degree of crosslinking as first a ballooning of the strand, secondly waviness in the strand and thirdly as a coarseness in the strand. The second condition was found to be the preferred extent of crosslinking. The results are shown in Table 2.

TABLE 2

THERMAL PROPERTIES OF EXTRUSION CROSSLINKED ALATHON 7040 HDPE

| Cross-linker Type | Concentration (phr) | Extruder Blending Cond. | Die Temp. (°C.) | Ext'd. Rod Appearance | Pellets Flow on Melting |
|---|---|---|---|---|---|
| none | — | — | — | smooth | yes |
| Lupersol 101[a] | 0.5 | hot mill | 175 | spiral | no |
| Lupersol 101[a] | 0.5 | RT/wet | 145 | smooth | yes |
| Lupersol 101[a] | 0.5 | RT/wet | 165 | spiral | slightly |
| Lupersol 130[b] | 0.5 | hot mill | 180 | smooth | slightly |
| Lupersol 130 | 0.5 | hot mill | 200 | rough | v. slightly |
| Lupersol 130 | 0.5 | RT/wet | 175 | spiral | no |
| Lupersol 130 | 0.25 | RT/wet | 175 | spiral | no |

[a]2,5 dimethyl-2,5, bis-(t-butyl peroxy) hexane (half-life = 24'/145° C.). A product of Pennwalt Corp.
[b]2,5 dimethyl-2,5, bis-(t-butyl peroxy) hexyne 3 (half-life = 18'/160° C.). A product of Pennwalt Corp.

EXAMPLE 5

A process for electron beam irradiation of HDPE pellets is illustrated by the following example.

Fifteen thousand (15,000) pounds of DuPont Alathon 7040 HDPE pellets were selected for irradiation. The electron beam accelerating potential was maintained at three million volts and the electron beam current was maintained at 31.3 milliamperes with a traverse speed of 16 ft/min, and a pellet bed depth less than 0.25 inch during the irradiation processing. The radiation processing of the pellets was conducted in air. The electron beam processing of the HDPE pellets was conducted at radiation doses of 2, 4, 6, and 8 megarads At each of the radiation dosage levels, the amount of pellets loaded onto the carts which carried the pellets through the electron beam was varied. The heaviest loading of pellets on the carts corresponded to an average pellet depth of approximately 0.37 inch, whereas the lightest loading corresponded to a single layer of pellets.

The thermal form stability of the irradiated pellets was investigated by maintaining the pellets in ethylene glycol at 150° Celsius for a 24-hour time interval. The melting point of the pellets is 133° Celsius. Hot pressed samples (right circular cylinders) were prepared by compressing pellets at a pressure of 4,000 pounds per square inch for 30 minutes. These hot pressed samples were cooled under pressure in the die to room temperature. After reaching room temperature, the pressure was released and the samples were recovered in the form of right circular cylinders. These right circular cylinders, prepared from the irradiated HDPE pellets, were placed in the ethylene glycol bath and maintained at a temperature of 150° Celsius for a 24-hour time interval.

Initially, all of the irradiated pellets which were compressed into the right circular cylinders appeared to be fused solidly together. After the thermal heat treatment, the original shape of the pellets again is evident even for those pellets which had received a 2 megarad dose. Those pellets which had received a 4 megarad dose or higher showed less tendency to remain together and exhibited a pronounced tendency to recover their original pellet shape. This recovery of the original shape of the crosslinked pellets, is a manifestation of the memory effect which is observed in crosslinked polyethylene products and illustrates the thermal form stability of the irradiated pellets. As a result of these experiments, it is concluded that pellets which have received at least a four megarad dose have good thermal form stability.

EXAMPLE 6

The thermal form stability of HDPE pellets which traveled through an electron beam is illustrated by the following example.

The irradiation of 15,000 pounds of Marlex 6006 HDPE pellets with a dose of 6 megarads was conducted using an electron accelerating potential of three million volts and a beam current of 31.3 milliamperes with a traverse speed of 16 ft/min and a pellet bed depth of about 0.25 inch. These samples of pellets were tested for thermal form stability in an ethylene glycol bath as in Example 4. They exhibited excellent thermal form stability.

EXAMPLE 7

Gamma radiation of polyethylene powder is illustrated by the following examples.

Five 1 kg samples of Marlex 6006 polyethylene powder were irradiated with the following doses of gamma radiation. The dose rate was 679 krad/hour absorbed average.

| Sample # | Dose (mrad) |
|---|---|
| 1 | 4.0 |
| 2 | 5.0 |
| 3 | 6.0 |
| 4 | 7.0 |
| 5 | 8.0 |

Each sample was purged with nitrogen by five $N_2$ pressure/vacuum cycles at ambient temperature.

EXAMPLE 8

The incorporation of the phase change material into the HDPE pellets is illustrated by the following examples.

The HDPEs were Marlex 6006 (Phillips) and Alathon 7040 (DuPont). The swelling experiments were conducted in two waxes—Witco LLN and Witco 45A available from the Witco Corporation.

A small weighed quantity (10g) of the pellet with a specified level of irradiation was placed into a beaker containing a weighed quantity of melted wax. The beaker contained a magnetic stirrer but additional outside stirring may be necessary. After the desired temperature was attained, the melted wax was allowed to soak into the HDPE for a desired time period. The product was then allowed to cool and was separated from the hot wax (still molten) by filtering through a 100-mesh wire screen. The swelled HDPE bead with a surface coating of wax was placed into a beaker and washed 3 times with hot hexane and then filtered. The swelled beads were then spread on a paper and kept overnight under a hood in order to evaporate the hexane.

Table 3 summarizes the data.

TABLE 3

| HDPE Irradiation Type and Dose | Paraffin Identity | Imbibing Time (hrs) | Imbibing Temperature (°C.) | Exp. Wt. of Paraffin Imbibed (%) | Calculated Wt. of Paraffin Imbibed from DOC (%) | Exp.-Calculated Wt. Difference (%) |
|---|---|---|---|---|---|---|
| 1. Electraon Beam 6 m-rad, air | LLN | 1.0 | 120 | 35.8 | 19.3 | 16.5 |
| 2. Electron Beam 6 m-rad, air | 45-A | 3.0 | 130 | 60.4 | 58.4 | 2.0 |
| 3. Electron Beam 6 m-rad, air | 45-A | 0.5 | 175 | 61.1 | 44.8 | 16.3 |
| 4. Electron Beam 6 m-rad, air | 45-A | 1.0 | 175 | 72.6 | 63.4 | 9.2 |
| 5. Electron Beam 6 m-rad, air | 45-A | 2.0 | 175 | 79.0 | 71.4 | 7.6 |
| 6. Electron Beam 14 m-rad, air | LLN | 1.0 | 95 | 2.8 | Negative | — |
| 7. Electron Beam 14 m-rad, air | 45-A | 1.0 | 130 | 42.0 | 46.8 | 4.8 |
| 8. Electron Beam 14 m-rad, air | 45-A | 2.0 | 150 | 60.6 | 56.4 | 4.2 |
| 9. Electron Beam 14 m-rad, air | 45-A | 2.0 | 170 | 62.5 | 57.4 | 5.1 |
| 10. Electron Beam 14 m-rad, air | 45-A | 1.0 | 175 | 57.6 | 48.6 | 9.0 |
| 11. Electron Beam 14 m-rad, air | 45-A | 0.5 | 175 | 52.0 | 33.7 | 18.3 |
| 12. Gamma 10 m-rad, air | LLN | 1.0 | 150 | 62.2 | 49.6 | 12.6 |
| 13. Gamma 6 m-rad, $N_2$ | 45-A | 1.0 | 150 | 75.0 | 62.0 | 13.0 |
| 14. Gamma 5 m-rad $N_2$ | 45-A | 1.0 | 150 | 76.0 | 72.6 | 13.4 |
| 15. Gamma 4 m-rad, $N_2$ | 45-A | 1.0 | 150 | 78.3 | 80.1 | — |
| 16. Gamma 3 m-rad, $N_2$ | 45-A | 1.0 | 150 | Dissolves | — | — |
| 17. Gamma 2 m-rad, $N_2$ | 45-A | 1.0 | 150 | Dissolves | — | — |

EXAMPLE 9

In an effort to further increase the phase change material pickup, swelling experiments were conducted on lower dosage Marlex 6006 and Alathon 7040 pellets.

50 grams of the Witco 45A wax were heated to 150° C. The wax was stirred using a stirring bar. Five grams of HDPE pellets were added and the stirred mixture held to 150° C. for 2 hours. The pellets were sieved from the hot wax and washed 3 times in methyl ethyl ketone at 50° C. The pellets were dried overnight in a vacuum and weighed. The results are indicated in Table 4.

TABLE 4

IRRADIATION CROSSLINKED MARLEX 6006 AND ALATHON 7040 HDPE PELLETS SWELLED IN HOT SOLUTIONS OF 45A WAX

| Material | Gamma Irrad. Dose m-rad in $N_2$ | Wax | Imbibing Time Hrs. | Imbibing Temp. °C. | Wt. Wax Imbibed Chg in Wt. % |
|---|---|---|---|---|---|
| Marlex 6006 | 3 | 45A | 2 | 150 | 20.5*** |
| Alathon 7040 | 3 | 45A | 2 | 150 | * |
| Marlex 6006 | 4 | 45A | 2 | 150 | 79.2 |
| Alathon 7040 | 4 | 45A | 2 | 150 | * |
| Marlex 6006 | 5 | 45A | 2 | 150 | 78.2 |
| Alathon 7040 | 5 | 45A | 2 | 150 | ** |
| Marlex 6006 | 6 | 45A | 2 | 150 | 75.0 |
| Alathon 7040 | 6 | 45A | 2 | 150 | 66.9 |

*HDPE is soluble in the wax.
**HDPE/wax mixture formed a gel.
***Partially soluble in wax. The true value for the wax imbibed by the HDPE pellet is probably approximately 80%.

EXAMPLE 10

Marlex 6006 HDPE pellets were crosslinked by electron beam irradiation at a dosage of 14 m-rad and swelled in Witco 45 A wax for 2 hours at 150° C. The pellets were incorporated into a concrete compositions and the compressive strength was measured. The results are shown in Table 5.

TABLE 5

| Sample | Vol % Pellets | Vol % Concrete | Compressive Strength |
|---|---|---|---|
| A | 17.5 | 82.5 | 1197 |
| B | 31.0 | 68.9 | 699 |
| Control | 0 | 100 | 1738 |

EXAMPLE 11

An uncrosslinked polypropylene composite was prepared by mixing polypropylene, Cab-O-Sil (silica), and Witco LLN wax in a Banbury mixer in the amounts shown in Table 6.

TABLE 6

| | Parts by Weight | | |
|---|---|---|---|
| Polypropylene | 100 | 100 | 100 |
| Silica | 0 | 10 | 10 |
| Witco LLN Wax | 25 | 25 | 50 |

EXAMPLE 12

Approximately 100–125 gm of Witco 45A wax was placed in a beaker and heated to the temperature of interest. While the wax was being stirred with a magnetic stirrer, about 10 gm of crystalline polypropylene (CPP) was added slowly. The mixture was stirred vigorously enough to prevent pellets from sticking to the sides of the beaker.

Runs were made at various time lengths and temperatures. When the swelling was completed, the excess wax was poured off and the pellets were washed with warm pentane.

EXAMPLE 13

Composites were also obtained by following the procedure of Example 8 but using Witco K-61 a product of Witco Corp. and NP-15 available from Exxon Corporation as the phase change material.

Having described the invention in detail and by reference to preferred embodiments thereof, it will be apparent that modifications and variations are possible without departing from the scope of the invention defined in the appended claims.

What is claimed is:

1. A composite useful in thermal energy storage, said composite being thermally form stable and being formed of a first material and a second material which is different from said first material, and which has a melting point less than said first material, but which is compatible with said first material, said first material comprising a crosslinked or uncrosslinked polyolefin matrix which serves as a containment means for said second material, and said second material comprising a crystalline alkyl hydrocarbon phase change material having a heat of fusion greater than about 30 cal./g. and a melting and a freezing point in the range of 0 to 80° C., said second material being contained within the matrix of said first material, thereby forming said composite.

2. The composite of claim 1 wherein said polyolefin is polyethylene, polypropylene, polybutene, crystalline polystyrene, or poly (4-methyl-pentene-1).

3. The composite of claim 2 wherein said polyolefin is crosslinked high density polyethylene.

4. The composite of claim 3 wherein said high density polyethylene is crosslinked to such a degree that said polyolefin matrix is form stable and said polyolefin matrix is capable of absorbing at least 10% by weight of said phase change material.

5. The composite of claim 1 wherein said composite is in a form selected from the group consisting of a pellet, a film or sheet, and a fiber or strand.

6. The composite of a claim 1 wherein said phase change material is imbibed into said polyolefin matrix by immersing said polyolefin matrix into a hot melt of said phase change material at a temperature higher than the crystalline melt point of said polyolefin.

7. The composite of claim 1 wherein aid polyolefin is crosslinked high density polyethylene, said phase change material is a crystalline alkyl hydrocarbon and said composite is in pellet form.

8. The composite of claim 5 wherein said composite is in pellet form and further including a non-polymeric cemetitious material into which said composite in pellet form is dispersed.

9. The composite of claim 8 wherein said polyolefin is cross-linked higher density polyethylene, said phase change material is a crystalline alkyl hydrocarbon, and said cementitious material is in the form of gypsum board.

* * * * *